(12) United States Patent
Hugeback et al.

(10) Patent No.: US 8,234,632 B1
(45) Date of Patent: Jul. 31, 2012

(54) ADAPTIVE WEBSITE OPTIMIZATION EXPERIMENT

(75) Inventors: Angela B. Hugeback, Seattle, WA (US); Kenneth Eric Vasilik, Bellevue, WA (US); Michael M. Meyer, Seattle, WA (US)

(73) Assignee: Google Inc., Mountain View, CA (US)

( * ) Notice: Subject to any disclaimer, the term of this patent is extended or adjusted under 35 U.S.C. 154(b) by 1116 days.

(21) Appl. No.: 11/876,221

(22) Filed: Oct. 22, 2007

(51) Int. Cl.
*G06F 9/44* (2006.01)

(52) U.S. Cl. .................................................. 717/130

(58) Field of Classification Search .................... 717/130
See application file for complete search history.

(56) References Cited

U.S. PATENT DOCUMENTS

| | | | |
|---|---|---|---|
| 5,870,559 A | 2/1999 | Leshem et al. | |
| 6,605,120 B1 | 8/2003 | Fields et al. | |
| 6,826,594 B1 | 11/2004 | Pettersen | |
| 6,963,874 B2 * | 11/2005 | Kasriel et al. | 709/224 |
| 7,178,101 B2 | 2/2007 | Tunning | |
| 7,353,272 B2 * | 4/2008 | Robertson et al. | 709/224 |
| 7,376,892 B2 | 5/2008 | Goldberg | |
| 7,574,691 B2 | 8/2009 | Freitas et al. | |
| 7,594,189 B1 | 9/2009 | Walker et al. | |
| 7,647,323 B2 * | 1/2010 | Kasriel et al. | 709/224 |
| 7,685,273 B1 * | 3/2010 | Anastas et al. | 709/224 |
| 7,783,514 B2 * | 8/2010 | Hogan | 709/224 |
| 7,962,363 B2 | 6/2011 | Patel et al. | |
| 7,975,000 B2 * | 7/2011 | Dixon et al. | 709/203 |
| 2002/0023112 A1 | 2/2002 | Avital | |
| 2002/0103758 A1 | 8/2002 | Powell | |
| 2002/0173998 A1 * | 11/2002 | Case | 705/7 |
| 2003/0130982 A1 * | 7/2003 | Kasriel et al. | 707/1 |
| 2004/0015775 A1 * | 1/2004 | Simske et al. | 715/500 |
| 2004/0075686 A1 | 4/2004 | Walter et al. | |
| 2004/0250236 A1 | 12/2004 | O'Malley et al. | |
| 2006/0085132 A1 | 4/2006 | Sharma et al. | |
| 2006/0101403 A1 | 5/2006 | Sharma et al. | |
| 2006/0101421 A1 * | 5/2006 | Bodden et al. | 717/130 |
| 2006/0141489 A1 * | 6/2006 | Allison et al. | 435/6 |
| 2006/0253850 A1 * | 11/2006 | Bruno et al. | 717/173 |
| 2006/0271671 A1 * | 11/2006 | Hansen | 709/224 |
| 2008/0065464 A1 * | 3/2008 | Klein et al. | 705/10 |
| 2008/0114875 A1 * | 5/2008 | Anastas et al. | 709/224 |
| 2009/0030859 A1 * | 1/2009 | Buchs et al. | 706/19 |
| 2009/0210863 A1 | 8/2009 | Vasilik et al. | |

OTHER PUBLICATIONS

Gofman, "Consumer Driven Multivariate Landing Page Optimization:Overview, Issues, and Outlook", Feb. 15, 2007, Moskowitz.*

Siu et al. "Flexible Interim Analysismethod for Sample Size Re-Estimation and Early Stopping", Aug. 2001, American Statistical Association.*

Tcherniak et al, "A web-based topology optimization program", 2001, Springer-Verlag.*

Koutras et al, "Resource Availability Optimization for Priority Classes in a Website", 2006, IEEE.*

(Continued)

*Primary Examiner* — Wei Zhen
*Assistant Examiner* — Junchun Wu
(74) *Attorney, Agent, or Firm* — Fish & Richardson P.C.

(57) ABSTRACT

Systems and methods for adaptive website optimization experiments. Adaptive website optimization can include collecting statistics associated with a number of landing page configurations and identifying a preferred group of landing page configurations during the pendency of an experiment based upon the collected statistics and preferentially selecting a landing page configuration from the preferred group of options for display by an instrumented web page associated with the experiment.

17 Claims, 5 Drawing Sheets

OTHER PUBLICATIONS

Weischedel et al, "Website Optimization with Web Metrics" A Case Study, 2006, ACM.*

D. DeMets & K Lan, "Interim Analysis: The Alpha Spending Function Approach" Statistics In Medicine, vol. 13, 1341-1352 (1994).

Kaelbling, Leslie Pack, "Learning in Embedded Systems" MIT pp. 39-66 (1993).

Lai, Tze Leung, "Adaptive Treatment Allocation and the Multi-Armed Bandit Problem" The Annals of Statistics, vol. 15, No. 3, pp. 1091-1114 (1987).

Lawless, J.F., "Statistical Models and Methods for Lifetime Data" pp. 71-76 (1982).

Miller, R.G., "Simultaneous Statistical Inference" $2^{nd}$ Edition, pp. 297-299 (1981).

Sternstein, Martin, "Statistics" Second Edition, pp. 121-123 (2005).

Sutton, R. & A. Barto, "Reinforcement Learning" pp. 25-49 (1998).

Vermorel, Joannes and Mehryar Mohri, "Multi-armed Bandit Algorithms and Empirical Evaluation" pp. 1-12 (2005).

Wald, Abraham, "Sequential Analysis" pp. 1-4 (1947).

Zhang, Li-X Feifang Hu and Siu Hung Cheung, "Asymptotic Theorems of Sequential Estimation-Adjusted Urn Models" pp. 340-369 (2005).

Kohavi, et al., "Practical Guide to Controlled Experiments on the Web: Listen to your Customers not to the HiPPO", 2007 ACM; [retrieved on Nov. 21, 2011]; Retrieved from Internet <URL:http://dl.acm.org/citation.cfm?id=1281295>; pp. 1-9.

Omniture, "A/B Testing Comparing Data", 2007; published online; [retrieved on Nov. 21, 2011]; Retrieved from Internet <URL:http://www.webmetric.org/white_paper/ab_testing.pdf>; pp. 1-6.

Kohavi, et al., "Front Line Internet Analytics at Amazon.com", Emetrics Summit 2004; [retrieved on Nov. 21, 2011]; Retrieved from Internet <URL:http://ai.stanford.edu/-ronnyklemetricsAmazon.pdf>; pp. 1-31.

Han, et al., "WebSplitter: A Unified XML Framework for Multi-Device Collaborative Web Browsing"; ACM 2004;[retrieved on Nov. 18, 2011]; Retrieved from Internet <URL:http://dl.acm.org/citation.cfm?id=358993>;pp. 221-230.

PCT Written Opinion of the International Searching Authority, PCTIUS2009/034563, dated Aug. 21,2009,7 pages.

USPTO, Non-Final Office Action for U.S. Appl. No. 12/033,364 dated Dec. 12, 2011, 15 pages.

* cited by examiner

# ADAPTIVE WEBSITE OPTIMIZATION EXPERIMENT

BACKGROUND

This disclosure is related to content identification.

With the exponential expansion of the internet, electronic commerce (e-commerce) markets have become an integral part of life for many people. Based upon the expansion of the market many publishers have been created to meet demand. These publishers have increased competition for business. Increased competition has increased the importance of publisher websites. For example, if a website is difficult to navigate, a consumer is likely to leave the website and use a competitors' website.

Tools have been created to help publishers create better websites. One such tool is Website Optimizer, available from Google Inc. of Mountain View, Calif. Such tools can enable publishers to specify several different options for a web page, and then the publisher can run an experiment to determine whether any of several options is better than a current version of the web page based upon a number of conversions (e.g., sales, navigations of a goal path, etc.). The experiment can run for a period of time. During this experiment period, the various options, including the current version, can be served to clients. Statistics associated with each of the various options can be collected and analyzed. Analysis can determine whether any of the specified options performed better than the current version during the experiment period. The results of the analysis can be provided to the publisher, who can then decide whether to implement any of the alternative versions of the web page or to retain a current version of the web page.

SUMMARY

Systems, methods and computer readable media for adaptive website experiments are provided. Example systems can include a website experiment interface, a statistics module and an option selection module. The website experiment interface can receive parameters for an experiment including options specifying a respective page configuration from a user. The website experiment interface can also provide a control script to the user based upon the options. The control script can be inserted into a landing page to provide an instrumented landing page. The statistics module can collect performance statistics associated with each of the options. The performance statistics can measure the performance of the instrumented landing page in the respective page configuration served to a client device. The statistics module can also identify a preferred group of options that are outperforming a non-preferred group of options. The option selection module can receive a communication from a client device based upon the client device loading an instrumented web page, and can provide a response to the communication specifying a selected option from among the plurality of options based upon the statistics module identifying a group of options that has been identified as outperforming another group of options.

Example methods for performing adaptive website experiments can include: starting a website optimization experiment, the website optimization experiment comprising the comparison of a plurality of alternative landing page configurations using an instrumented landing page; collecting statistics associated with each of the alternative landing page configurations; receiving a communication from a browser based upon the browser loading an instrumented landing page; analyzing the collected statistics to determine whether a preferred group of the plurality of alternative landing pages provides better results than a non-preferred group of alternative landing pages; and, preferentially serving the communication based upon the analysis.

Example computer readable media can be operable to cause a processor to perform steps comprising: initiating a website optimization experiment to determine whether a particular landing page configuration from among a plurality of alternative landing page configurations including a current landing page configuration performs better than other of the alternative landing pages configurations; collecting statistics related to the performance of each of the plurality of alternative landing pages configurations; receiving a communication from a client responsive to the client loading an instrumented landing page containing the plurality of alternative landing page configurations, the communications comprising a request to identify a selected landing page configuration from the plurality of alternative landing page configurations; determining whether a preferred group of landing page configurations exists based upon the collected statistics, the preferred group of landing page configurations comprising one or more landing page configurations that are performing better than a non-preferred group of landing page configurations; and, communicating a response to the communication based upon the determination.

Other implementations are disclosed, including implementations directed to systems, methods, apparatuses, computer-readable mediums and user interfaces.

DETAILED DESCRIPTION

Website optimization experiments can be performed to determine whether a publisher can find a better landing page configuration than a current landing page configuration. However, there is a cost associated with performing such experiments. The cost is an opportunity cost based upon the inference that if a better option is found during the experiment, that a worse option is served some non-trivial number of times during the course of the experiment. For example, if an experiment has options A, B, C, and D, and option C performs better than the other options, there is a period of time during which options A, B and D are served to the user thereby foregoing the chance to provide the best option to the user. Thus, the best performing option should be identified as quickly as possible. However, the shorter the duration of the experiment, the more difficult it can be to correctly identify the best performing option because the collected results may not be statistically significant or may be based upon aberrations resulting from, for example, temporary market conditions.

In some implementations, an adaptive website optimization experiment can be derived whereby the duration of the experiment is sufficient to identify a better performing option from among a number of options, while also identifying and preferentially serving any options that appear to be performing better than other options during the experiment. In such implementations, the experiment can be continued until its intended expiration, thereby providing confidence that the experiment results are correct, while also reducing the opportunity cost associated with providing lesser performing options to the client.

Figure 1:
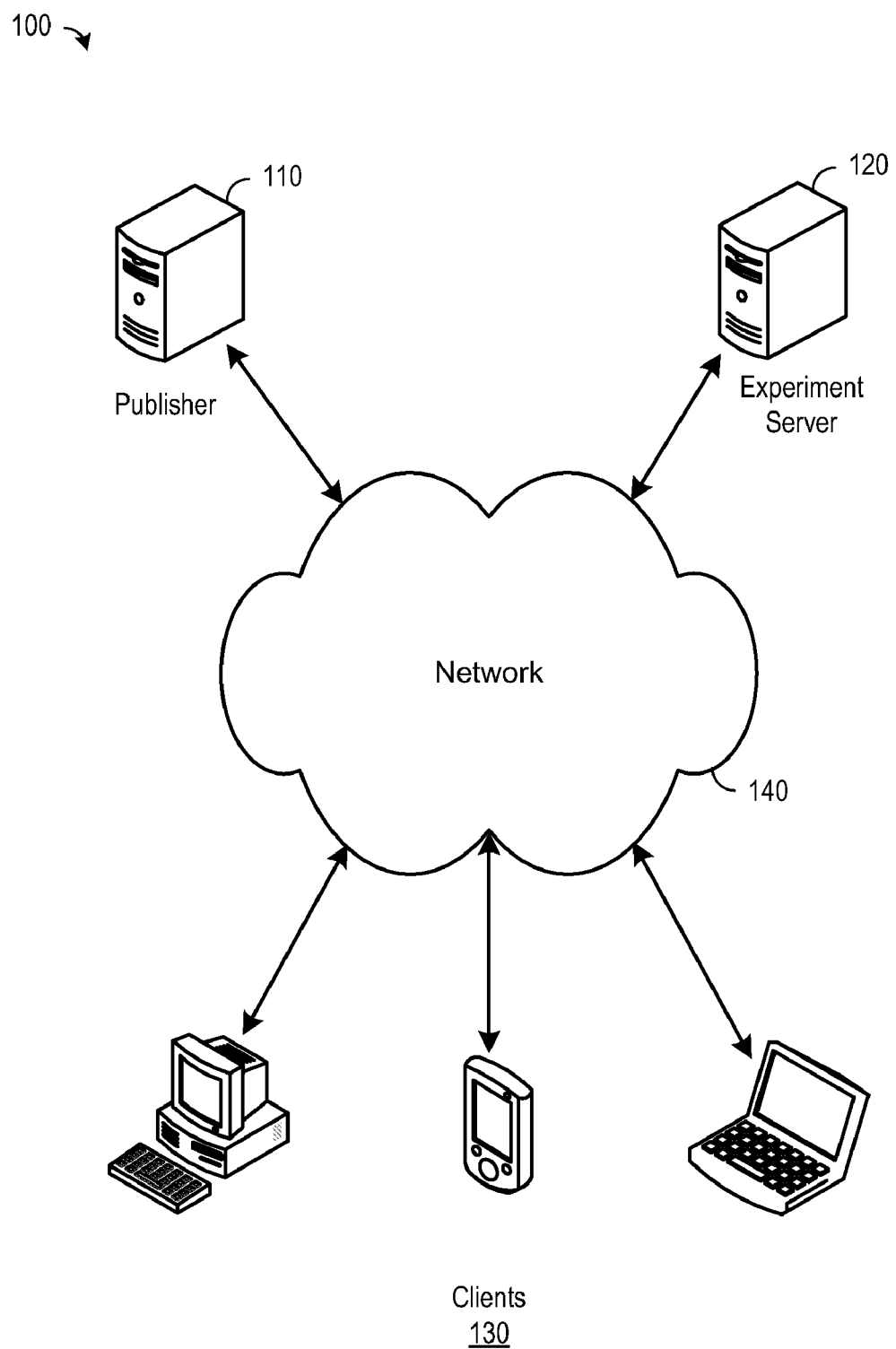
FIG. 1 is a block diagram of an example network architecture that can provide adaptive website optimization experiments.

FIG. 1 is a block diagram of an example network architecture 100 that can provide adaptive website optimization experiments. The network architecture 100, in some implementations, can include a publisher 110, an experiment server 120, clients 130 and a network 140. In some examples, the publisher 110 can include a landing page (e.g., a web page) offering a product for sale. In various examples, search engines and other third party websites can provide a link (e.g., a universal resource locator (URL)) pointing to the landing page. In an effort to maximize conversions (e.g., sales, progression along a goal path, etc.) from traffic received on the website, the publisher 110 can make changes to the landing page to influence customer experience.

In some implementations, the publisher 110 might want to test multiple variations of a landing page against each other. In such implementations, the publisher 110 can use a website experiment server 120 to collect statistics regarding each of the variations of the landing page. An example of the website experiment server 120 is Website Optimizer available from Google Inc. of Mountain View, Calif. The publisher 110 can provide experiment parameters to the website experiment server 120 including, for example, each of the options being tested. In other examples, the experiment parameters can include an experiment duration.

In some implementations, the website experiment server 120 can provide a control script to the publisher 110. For example, the control script could be a snippet of hypertext markup language (HTML) or extensible markup language (XML) code. The control script can be inserted into the landing page by the publisher along with each of the landing page variations to produce an instrumented landing page.

In some implementations, the instrumented landing page is configured to provide statistics back to the website experiment server 120. For example, upon being loaded by a client device 130, the instrumented landing page can communicate with the website experiment server 130 to identify which of the variations of the landing page to display on the client. The control script can also communicate with the experiment server 120 responsive to user interaction (e.g., a selection of any links) with the displayed variation of the landing page.

In other implementations, the website experiment server 120 can act as a proxy server for the publisher 110 and serve a selected landing page to the client 130. For example, the website experiment server can be associated with a search engine and can provide advertisements including an advertisement for the landing page to the client. Upon selection of a URL associated with the landing page in such examples, the search engine can retrieve and instrumented web page, select the option to be served and serve the option to the client within a search engine environment (e.g., within a frame). Thus, user selections of any of the links associated with the website can be received and logged by the website experiment server 120.

In yet another implementation, a search engine can provide an advertisement associated with the instrumented landing page to client devices. Upon selection of the advertisement, the search engine in conjunction with the website experiment server can send the request to the publisher along with an instruction regarding which variation of the landing page to serve to the client 130. The landing page served to the client 130 can include a control script operable to communicate any customer actions (e.g., selection of any hyperlinks) on the landing page back to the experiment server 120, which can collect and compile the statistics associated with the variation served to the client device 130.

In some implementations, the experiment server 120 can determine whether any of the variations of the landing page are performing better than other of the variations. If any of the variations of the landing page are performing better than other of the variations, the better performing variation can be identified as a preferred group of landing page variations. For example, if a first subset (e.g., one or more) of landing page variations has resulted in more conversions than a second subset of landing page variations, the first subset can be identified by the website experiment server 120 as the preferred group of landing page variations. The second subset can be identified by the website experiment server 120 as a non-preferred group of landing page variations.

In some implementations, the website experiment server 120 can instruct the client 130 or the publisher 110 to preferentially serve options from the preferred group of landing page variations. The preferentially served preferred group of landing pages can thereby be served more frequently than the options from the non-preferred group. For example, options from the preferred group of landing page variations can be served more frequently (e.g., 80% of the time) versus those options from the non-preferred group of landing page variations (e.g., 20% of the time).

In some implementations, the website experiment server 120 can defer identifying a preferred group and a non-preferred group of options until a statistically significant sample size has been obtained. In some examples, five opportunities are collected for each of the alternative variations of the landing page before the website experiment server 120 identifies a preferred group and non-preferred group of landing page variations.

In further implementations, the website experiment server 120 can also adjust the collected data to reduce the possibility of error. For example, in those instances where the experiment includes multiple options a correction algorithm (e.g., a Bonferroni correction algorithm) can be used to adjust the collected statistics to account for the comparison of multiple options. In other examples, in those instances where the update is occurring before the end of the experiment, an alpha spending function can be applied to the collected statistics to account for potential errors that might occur based upon premature interpretation of the statistics. The alpha spending function can be used to determine when the experiment can be interrupted.

Figure 2:
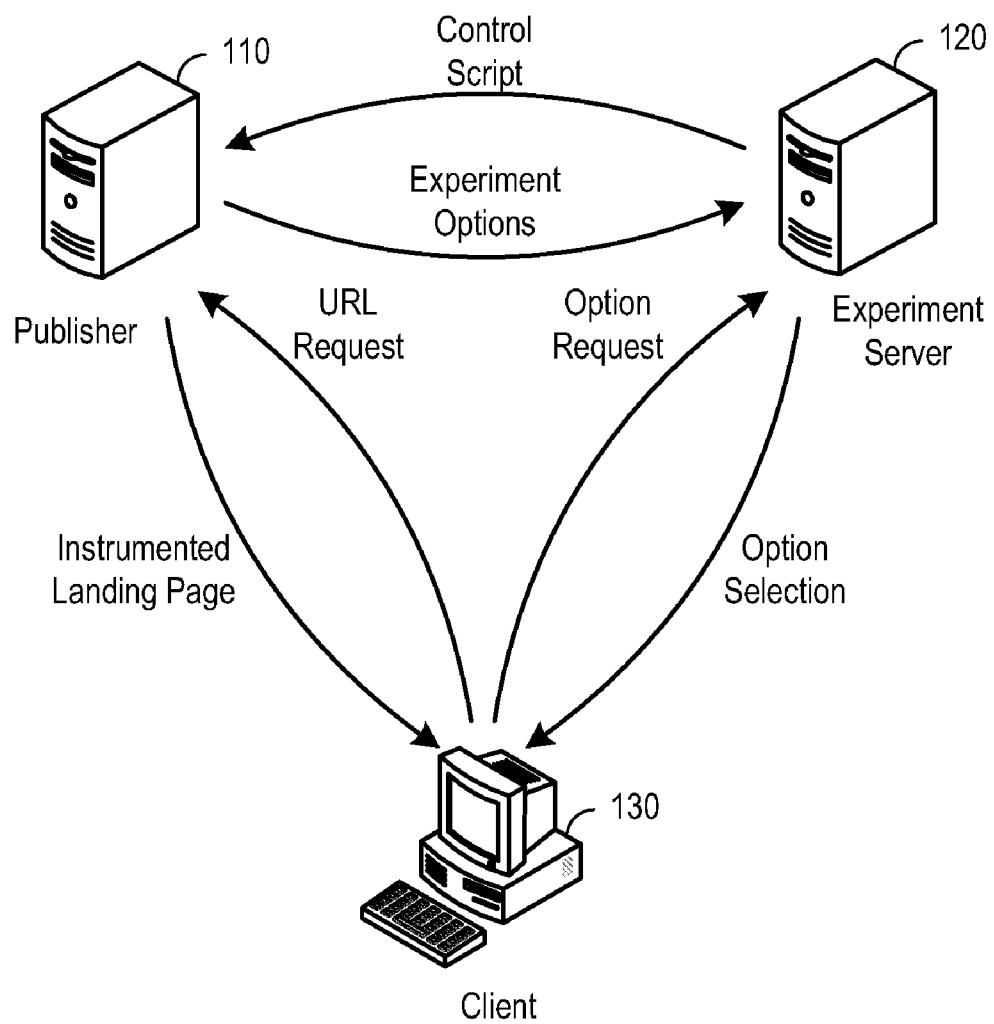
FIG. 2 is a block diagram of an example data flow associated with network devices executing an adaptive website optimization experiment.

FIG. 2 is a block diagram of an example data flow associated with network devices executing an adaptive website optimization experiment. In various implementations, a publisher 110 can communicate experiment options to an experiment server 120. The experiment server 120 can provide a control script to the publisher 110. The publisher 110 can insert the control script into a landing page to produce an instrumented landing page.

In various implementations, the instrumented landing page can facilitate the collection of data associated with the instrumented landing page. For example, a client 130 can send a URL request to the publisher 110 to request the landing page. The publisher 110 can respond to the URL request by providing the instrumented landing page to the client 130. The instrumented landing page, when loaded by a client 130 can cause the client 130 to communicate with the experiment server 120.

In some implementations, the instrumented landing page can request which of a number of configurations of the landing page included in the instrumented landing page should be displayed by the client. For example, an instrumented landing page might include five options for landing page configurations. The control script included in the instrumented landing page can cause the client 130 to communicate with the experiment server 120 to determine which of the five options are to be displayed by the client 130.

The experiment server 120 can operate to determine which of the optional landing page configurations should be displayed by the client 130. In some implementations, the experiment server 120 can provide instructions that operate to provide a random distribution of each of the optional landing page configurations to requesting clients 130 during an initial portion of the experiment. For example, a random distribution would randomly select from among the landing page options to instruct the instrumented landing page to display to the client 130. Thus, the chance that any particular optional landing page configuration is chosen for display to the user is equal to the chance that any other optional landing page configuration is chosen for display to the user.

In some implementations, the experiment server 120 can determine when a statistically significant sample size has been collected. A statistically significant sample size can indicate, for example, that each of the options has been served to enough clients so as to be able to make some predictions about the results of the experiment. In such implementations, when the statistically significant sample size has been collected, a second phase of the experiment can begin. During the second phase of the experiment, a group of preferred landing page configurations can be identified which have provided better results for the publisher 120. The experiment server 120 can compare the landing page configurations based upon which of the landing page configurations result in a greater percentage of conversion than other of the landing page configurations. For example, if options A and B result in about a 10% conversion rate, while option C results in a 4% conversion rate and option D results in a 6% conversion rate, the experiment server can group optional landing page configurations A and B into a preferred group and optional landing page configurations C and D into a non-preferred group.

In some implementations, during the second phase of the experiment, the experiment server 120 can instruct the instrumented landing pages to serve landing page configurations from a preferred group more frequently than the experiment server 120 instructs instrumented landing pages to serve landing page configurations from a non-preferred group. For example, the experiment server can instruct the instrumented landing page control script to display landing page configurations from the preferred group 80% of the time, while instructing the instrumented landing page control script to display landing page configurations from the non-preferred group 20% of the time.

In various implementations, the experiment server can update the preferred group and non-preferred group of landing page configurations based upon updated statistics collection. For example, if three landing page configurations appear to be performing better than two landing page configurations at a first analysis of the collected statistics, updated statistics might indicate that performance of a fourth configuration has improved and should be moved into the preferred group. In other examples, it might be determined that performance of a configuration included in the preferred group has declined and should be moved into the non-preferred group.

In some implementations, the analysis of the statistics to identify preferred and non-preferred groups can occur whenever a request is received from a client 130 loading the instrumented landing page. In other implementations, the analysis of the statistics to identify preferred and non-preferred groups can occur on a periodic basis (e.g., hourly, semi-daily, daily, semi-weekly, weekly, etc.). In yet further implementations, the analysis of the statistics to identify preferred and non-preferred groups can occur on an aperiodic basis. For example, the analysis can occur every time a specified number of instrumented landing page requests have been served.

The experiment server 120 can provide the results of the website optimization experiment to the publisher 110, for example, at the end of an experiment period.

Figure 3:
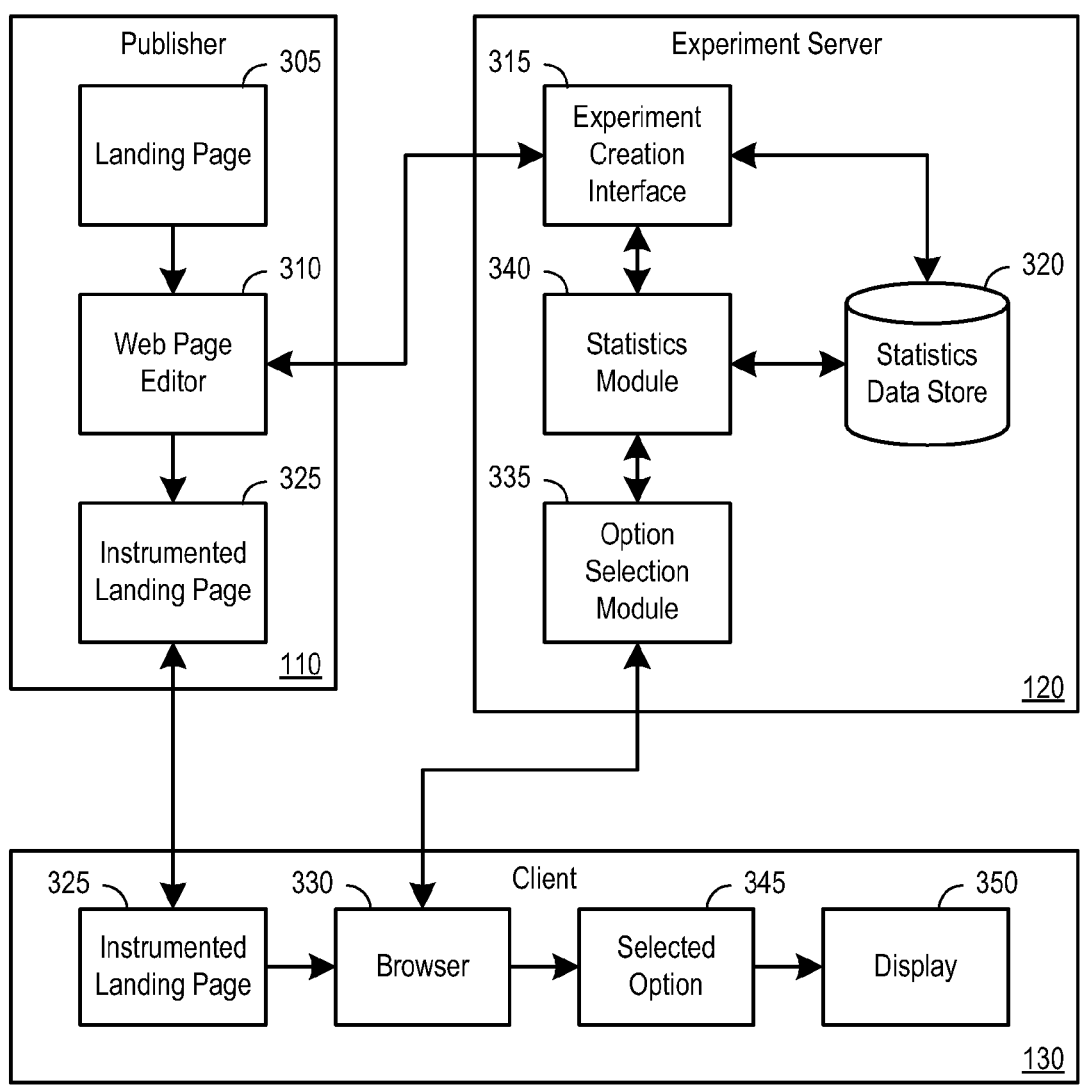
FIG. 3 is a block diagram of example device components used to execute an adaptive website optimization experiment.

FIG. 3 is a block diagram of example device components used to execute an adaptive website optimization experiment. A publisher can include a landing page 305 used to make a conversion (e.g., sell a product, direct users to another site, etc.). The publisher 110 can include an editor 310, in some implementations, used to create and edit the landing page. For example, if the publisher 110 wants to edit his/her landing page, the publisher 110 can use the editor to create an edited landing page.

In some implementations, the publisher 110 might decide to test a new version (or versions) of the landing page against a current version of the landing page. In such instances, the publisher 110 can communicate with an experiment creation interface 315 on an experiment server 120. The experiment creation interface 315 can facilitate the creation of an experiment. For example, the publisher 110 can provide his/her optional landing page configurations to the experiment creation interface 315 using the editor 310. In some implementations, the publisher 110 can also provide an experiment duration.

The experiment creation interface 315 can store the parameters associated with the experiment in a statistics data store 320. In some implementations, the experiment creation interface 315 can also provide a control script to the publisher 110. The publisher 110 can insert the control script into the landing page 305 using the editor 310 to produce an instrumented landing page 325.

In some implementations, the instrumented landing page 325 can be provided to a client 130 based upon a request (e.g., URL request) received from the client 130. The client 130 can include a browser 330 operable to load the instrumented landing page 325 received from the publisher 110. The browser 330, upon loading the instrumented landing page 325, will encounter the control script previously inserted into the instrumented landing page 325 by the publisher 110. The control script can cause the browser 330 to send a communication to an option selection module 335 at the experiment server 120.

In some implementations, the option selection module 335 can communicate with a statistics module 340 to determine whether a threshold sample size has been obtained. In some examples, the threshold sample size can be set to five views of each of the alternative landing page configurations.

In some implementations, if a threshold sample size has been obtained, the statistics module 340 will also have identified a preferred group of landing page configurations and a non-preferred group of landing page configurations. The preferred group of landing page configurations can be identified based upon those landing page configurations outperforming other landing page configurations. In various implementations, performance of a landing page configuration can be based upon the number of conversions resulting from the instances where the landing page is served to the client 130. In those instances, where a preferred group of landing page configurations has been identified, the preferred group of landing page configurations can be communicated to the option selection module 335. In some implementations, a top $0.2^{th}$ quantile can be identified based upon the performance of the landing pages as measured by the conversion rate, and can be allocated to the preferred group of landing page configurations. In some implementations, a current landing page configuration can always be included in the preferred group of landing page configurations. In such implementations, the publisher 110 can be assured that the current version of the page is not served a statistically significant number of times less than other landing page configurations. Such implementations can provide the publisher 110 with confidence that the current landing page configuration is given every opportunity to outperform the other landing page configurations.

In an initial phase of the experiment (e.g., before a threshold sample size is obtained), the option selection module 335 can select from the optional landing page configurations, for example, randomly or pseudo-randomly. The option selection module 335 can provide instructions to the instrumented landing page 325 to display such randomly/pseudo-randomly selected landing page configuration 345 on the display 350. In a secondary phase of the experiment (e.g., after a threshold sample size is obtained), the options selection module 335 can select from the optional landing page configurations with a bias towards selecting landing page configurations from the preferred group of landing page configurations. The selected landing page configuration can be communicated to the instrumented landing page 325 and the selected option 345 displayed by the client 130 using a display 350. In various implementations, the bias can be In various implementations, statistics can be collected throughout the various phases of the experiment. For example, every time a communication is received from the client 130, the communication can be logged to the statistics data store 320 by a statistics module 340. In some implementations, the statistics module 340 can periodically (e.g., every two hours) update the analysis of the statistics. In other implementations the statistical analysis of the collected statistics stored in the statistics data store 320 can be updated every time a request is received from the client 130. In such implementations, a current analysis of the statistics can be served to the client 130.

In some implementations, the statistics module 340 can perform a multiple comparison adjustment function on the collected statistics before presenting the results to the user, thereby accounting for the presence of more than two optional landing page configurations. For example, the comparison of three different options can produce an error because the comparison is not one-to-one. The multiple comparison adjustment function can include a Bonferroni adjustment of the collected statistics.

In some implementations, the statistics module 340 can perform an interim analysis of the collected statistics to determine when to end the experiment. Interim analysis can adjust the collected statistics based upon the probability that any statistical differences taken at a point during the experiment are merely noise, rather than statistically significant differences. An O'Brien-Fleming type alphas spending function can be used to adjust the collected statistics to correct for the possible error introduced by interpreting the data prior to the end of the experiment. In other implementations, sequential analysis of the data can be used to account for possible error introduced by interpreting the data before the end of the experiment.

In various implementations, the Bonferroni and O'Brien-Fleming type alpha spending function adjustments are made to reduce the chance that a false positive is detected. For example, these functions can be applied to avoid situations where one landing page configuration performs better than another landing page configuration when there is in fact no basis for making such determination (e.g., based upon the current collection of statistical data).

Figure 4:
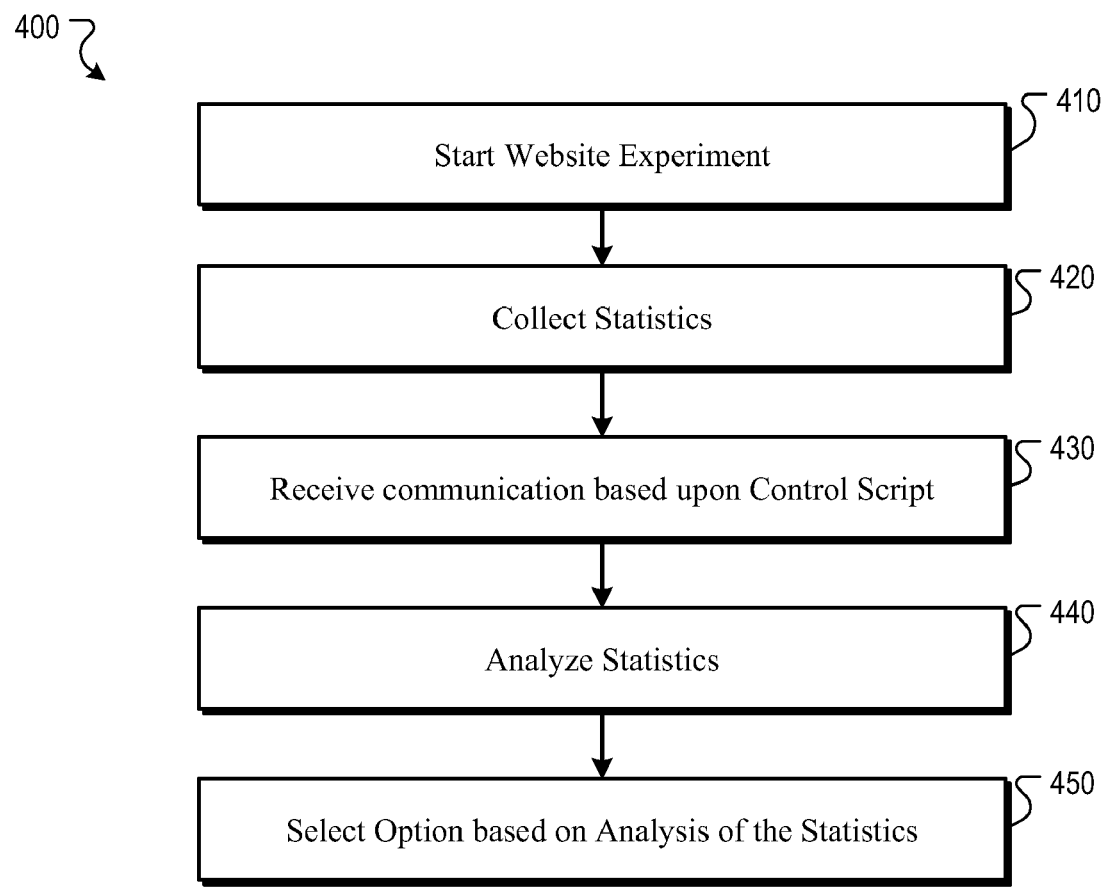
FIG. 4 is a flowchart of an example method for providing an adaptive website optimization experiment.

FIG. 4 is a flowchart of an example method 400 for providing an adaptive website optimization experiment. The experiment starts at stage 410. The experiment can be started, for example, by an experiment server (e.g., experiment server 120 of FIG. 3). In various implementations, the experiment can be started after a publisher provides a plurality of options to the experiment server, and the experiment server provides a control script to the publisher for insertion into the landing page code (e.g., HTML, Java, XML, etc.).

Statistics are collected at stage 420. The statistics can be collected, for example, by a statistics module (e.g., statistics module 340 of FIG. 3) in conjunction with a statistics data store (e.g., statistics data store 320 of FIG. 3) and a control script included in the instrumented landing page (e.g., instrumented landing page 325 of FIG. 3). In various implementations, statistics can include the number of times a landing page configuration has been served and the number of conversions associated with the landing page configuration, and any other data forwarded by the instrumented landing page. In some implementations, statistics can be collected and updated throughout the experiment.

A communication can be received at stage 430. The communication can be received, for example, by an option selection module (e.g., options selection module 335 of FIG. 3). In various implementations, the communication is based upon a browser loading an instrumented web page including a control script. In some implementations, the communication is a request to the experiment server 120 to identify which of the landing page configurations is to be served to the client. For example, if an instrumented landing page includes options A, B, C and D, the instrumented landing page can communicate with the experiment server to determine which option to serve. In such examples, the option selection module can select a landing page configuration to serve based upon a phase of the experiment and instruct the instrumented landing page to serve the selected landing page configuration.

Collected statistics can be analyzed at stage 440. The statistics can be analyzed, for example, by a statistics module (e.g., statistics module 340 of FIG. 3). In some implementations, the statistics module can identify a preferred group of landing page configurations based upon the conversion rates associated with each of the respective landing page configurations. For example, if an experiment includes options A, B, C and D, and option A has a 30% conversion rate, option B has a 20% conversion rate, option C has a 34% conversion rate, and option D has a 15% conversion rate, options A and C can be identified as belonging to a preferred group of landing page configurations. In some implementations, the statistics associated with the each of the landing page configurations can be adjusted using a multiple comparison adjustment and/or an interim analysis adjustment.

An option can be selected at stage 450. The option can be selected, for example, by an option selection module (e.g., option selection module 335 of FIG. 3) in conjunction with a statistics module (e.g., statistics module 340 of FIG. 3). In some implementations, the option selection module can randomly/pseudo-randomly select from among the landing page configurations during an initial phase of the experiment. For example, if less than five conversions have been collected for each of the landing page configurations, the option selection module can randomly/pseudo-randomly select from among the landing page configurations. In some implementations, the options selection module can bias the selection from among the landing page configurations during a secondary phase of the experiment. For example, after five conversions have been collected for each of the landing page configurations, the option selection module can select landing page configurations from a preferred group of landing page configurations more frequently than from a non-preferred group of landing page configurations. In some examples, the preferred group of landing page configurations can be selected 80% of the time, while a non-preferred group of landing page configurations can be selected 20% of the time.

In various implementations, the selection of a landing page configuration from within a preferred group of landing page configurations or from with a non-preferred group of landing page configurations is random. For example, the option selection module can determine whether to select from a preferred group of landing page configurations. After determining whether to select from the preferred group, each of the members of the preferred group can have an equal chance of being selected by the option selection module.

In some implementations, the option selection module can notify the statistics module of which option was selected, and forward any further communications from the instrumented landing page to the statistics module for storage in a statistics data store (e.g., statistics data store 320 of FIG. 3).

Figure 5:
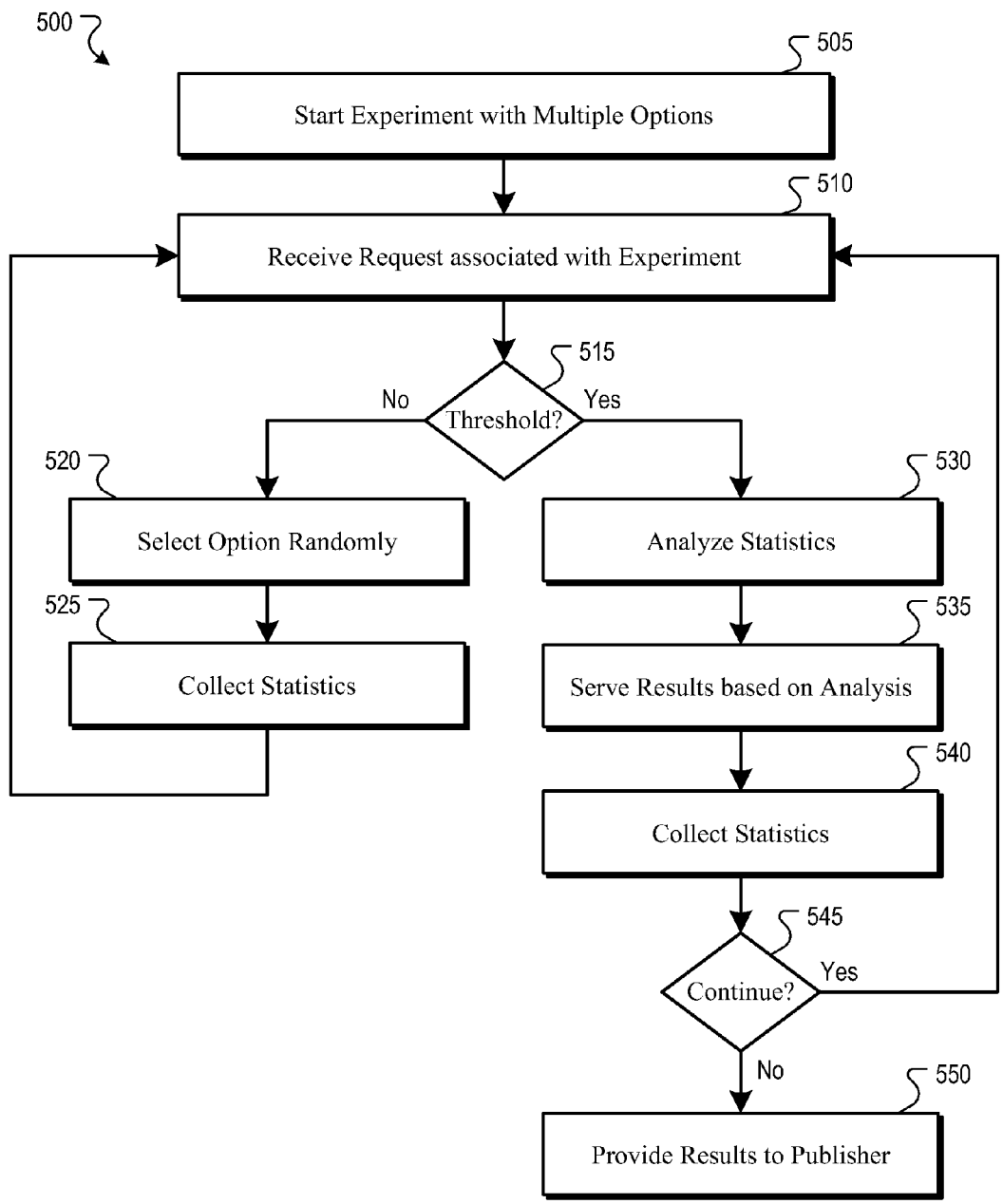
FIG. 5 is a flowchart of another example method for providing an adaptive website optimization experiment.

FIG. 5 is a flowchart of another example method 500 for providing an adaptive website optimization experiment. The experiment starts at stage 505. The experiment can be started, for example, by an experiment server (e.g., experiment server 120 of FIG. 3). The experiment can include multiple options associated with the various landing page configurations that can be displayed to a client.

Statistics are collected at stage 510. The statistics can be collected, for example, by a statistics module (e.g., statistics module 340 of FIG. 3) in conjunction with a statistics data store (e.g., statistics data store 320 of FIG. 3) and a control script included in the instrumented landing page (e.g., instrumented landing page 325 of FIG. 3). In various implementations, statistics can include the number of times a landing page configuration has been served and the number of conversions associated with the landing page configuration, and any other data forwarded by the instrumented landing page. In some implementations, statistics can be collected and updated throughout the experiment.

A determination is made whether the statistics have reached a threshold at stage 515. The determination can be made, for example, by a statistic module (e.g., statistics module 340 of FIG. 3). In some implementations, the threshold can specify a number of conversions collected by each of the landing page configurations. For example, the threshold can specify that five conversions be collected for each of the optional landing page configurations.

If the threshold has not been met, a landing page configuration can be selected (e.g., randomly or pseudo-randomly) from among the optional landing page configurations at stage 520. The landing page configuration can be randomly/pseudo-randomly selected, for example, by an option selection module (e.g., option selection module 335 of FIG. 3). A random selection from among the landing page configurations, for example, can result in a uniform distribution of the various landing page configurations.

Statistics can then be collected at stage 525. The statistics can be collected, for example, by a statistics module (e.g., statistics module 340 of FIG. 3). In some implementations, the statistics can be collected based upon communications received from an instrumented landing page (e.g., instrumented landing page 325 of FIG. 3) that has been loaded by a browser (e.g., browser 330 of FIG. 3). The instrumented landing page, in various implementations, can communicate activity by a user of the browser back to the experiment server for collection and analysis. New communications can then be received again at stage 510.

When a threshold has been met, collected statistics can be analyzed at stage 530. The statistics can be analyzed, for example, by a statistics module (e.g., statistics module 340 of FIG. 3). In some implementations, the statistics module can operate to identify a preferred group of the landing page configurations which is performing better than the other landing page configurations based upon a conversion rate associated with the respective page configurations. In some implementations, the analysis of the statistics can include a Bonferroni correction and/or an interim analysis correction to determine when to end the experiment. Such corrections can account for the possibility of error in making judgments regarding the statistics. Other corrections are possible.

Results can be served at stage 535. Results can be served, for example, by an option selection module (e.g., option selection module 535 of FIG. 3). In some implementations, the results include instructions to an instrumented landing page (e.g., instrumented landing page 325 of FIG. 3) identifying which of the landing page configurations to display on the client.

Statistics can be collected at stage 540. The statistics can be collected, for example, by a statistics module (e.g., statistics module 340 of FIG. 3). In some implementations, the statistics can be collected based upon communications received from an instrumented landing page (e.g., instrumented landing page 325 of FIG. 3) that has been loaded by a browser (e.g., browser 330 of FIG. 3).

At stage 545 a determination can be made whether to continue the experiment. The determination can be made, for example, by a statistics module (e.g., statistics module 340 of FIG. 3) in conjunction with a statistics data store (e.g., statistics data store 320 of FIG. 3). In some implementations, the determination can be made based upon the expiration of an experimental period associated with the experiment, as identified by an experiment duration stored in the statistics data store. In other implementations, a publisher can stop the experiment. In still further implementations, the statistics module can discontinue an experiment when it becomes substantially certain that a better option has been identified. For example, if one landing page configuration is substantially outperforming all other options over a statistically significant period of data, the statistics module might determine that it is not necessary to run the experiment over the entire duration originally specified. If the experiment is to be continued, the method 500 waits for another communication to be received from a new instance of an instrumented landing page (e.g., instrumented landing page 325 of FIG. 3).

If a determination is made to discontinue the experiment, the results can be presented to the publisher at stage 550. The results can be presented to the publisher, for example, by an experiment interface (e.g., experiment creation interface 315 of FIG. 3). In some implementations, the results can include a presentation of the relative statistical comparison of the performances of the various landing page configurations included in the experiment.

Systems and methods disclosed herein may use data signals conveyed using networks (e.g., local area network, wide area network, internet, etc.), fiber optic medium, carrier waves, wireless networks, etc. for communication with one or more data processing devices (e.g., advertisers 102, advertising system manager 104, publishers 106, users 108, advertisement creation system 112, etc.). The data signals can carry any or all of the data disclosed herein that is provided to or from a device.

The methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

This written description sets forth the best mode of the invention and provides examples to describe the invention and to enable a person of ordinary skill in the art to make and use the invention. This written description does not limit the invention to the precise terms set forth. Thus, while the invention has been described in detail with reference to the examples set forth above, those of ordinary skill in the art may effect alterations, modifications and variations to the examples without departing from the scope of the invention.

These and other implementations are within the scope of the following claims.

What is claimed is:

1. A system comprising:
one or more processors;
a computer-readable storage medium coupled to the one or more processors and having instructions stored thereon, which, when executed by the one or more processors, cause the one or more processors to perform operations to provide:
a website experiment interface operable to receive, from a publisher of a website, parameters for an experiment including a plurality of options, each option specifying a respective page configuration, and operable to provide a control script to the publisher based upon the options, the control script being operable to be inserted into a landing page to provide an instrumented landing page;
a statistics module operable to collect performance statistics associated with each option, the performance statistics measuring a performance of the instrumented landing page in each respective page configuration served to a client device, the statistics module being further operable to analyze the performance statistics to identify a preferred group of options and a non-preferred group of options, the options of the preferred group outperforming the options of the non-preferred group, the statistics module operable to:
produce adjusted statistics based upon:
adjusting the performance statistics based upon at least one of a first correction for performing multiple comparisons if there are more than two alternative landing page configurations, and a second correction for performing an interim analysis if the determination is being made prior to the scheduled end of the website optimization experiment, and
analyzing the adjusted statistics to identify one or more of the plurality of landing page configurations that is performing statistically significantly better than any other one or more of the plurality of landing page configurations; and an option selection module operable to receive a communication from the client device based upon the client device loading the instrumented web page, the option selection module being operable to, in response to the communication, provide a page configuration corresponding to a selected option from the preferred group of options, the page configuration being provided to the instrumented landing page, the selected option being selected more frequently from the preferred group of options than from the non-preferred group of options.

2. The system of claim 1, wherein the statistics module is operable to defer identification of the preferred group of options and the non-preferred group of options until a threshold sample size is obtained.

3. The system of claim 1, wherein the statistics module is operable to update the preferred group of options and the non-preferred group of options throughout a duration of the experiment specified by the parameters associated with the experiment.

4. The system of claim 1, wherein the system is operable to reduce a cost associated with running the experiment, the cost comprising an opportunity cost associated with each time a low-performing option from among the plurality of options is served to the client device relative to a higher performing option from among the plurality of options.

5. The system of claim 1, wherein the website experiment interface is operable to receive a request to review current results during an experiment period associated with the experiment, the website experiment interface being operable to retrieve a current set of results from the statistics module, the statistics module being operable to adjust the current set of results using an alpha spending function.

6. A method comprising:
initiating a website optimization experiment, the website optimization experiment comprising a comparison of a plurality of alternative landing page configurations using an instrumented landing page;
collecting statistics associated with each of the alternative landing page configurations;
producing adjusted statistics by adjusting the statistics based upon at least one of a first correction for performing multiple comparisons if there are more than two alternative landing page configurations, and a second correction for performing an interim analysis if the determination is being made prior to the scheduled end of the website optimization experiment;
receiving a communication from a browser based upon the browser loading the instrumented landing page;
analyzing, in response to the communication, the adjusted statistics to identify one or more of the plurality of alternative landing page configurations that is performing statistically significantly better than any other one or more of the plurality of alternative landing page configurations; and preferentially providing a selected landing page configuration to the instrumented landing page based upon an analysis of the adjusted statistics, the selected landing page configuration being selected more frequently from a preferred group of alternative landing page configurations than from the non-preferred group of alternative landing page configurations.

7. The method of claim 6, wherein producing adjusted statistics comprises adjusting the statistics using a multiple comparison correction algorithm.

8. The method of claim 7, wherein producing adjusted statistics comprises adjusting the statistics using an alpha spending function prior to determining whether any of the plurality of alternative landing page configurations is currently forecasted to provide better results than the non-preferred group of alternative landing page configurations.

9. The method of claim 6, further comprising deferring a determination of the preferred group of alternative landing page configurations and the non-preferred group of alternative landing page configurations until a threshold sample size is obtained.

10. The method of claim 6, further comprising updating the preferred group of alternative landing page configurations and the non-preferred group of alternative landing page configurations throughout a duration associated with the website optimization experiment.

11. The method of claim 6, further comprising reducing a cost associated with running the website optimization experiment, the cost comprising an opportunity cost associated with each time a low-performing alternative landing page configuration from among the plurality of alternative landing page configurations is served to a client device relative to a higher performing alternative landing page configuration from among the plurality of alternative landing page configuration.

12. The method of claim 6, further comprising:
receiving a request to review current results during an experiment period associated with the website optimization experiment;
retrieving the current results based upon the statistics; and
providing the current results to a publisher associated with the website optimization experiment.

13. One or more computer readable media operable to select a landing page configuration from among a plurality of alternative landing page configurations and coupled to one or more processors having instructions stored thereon, that when executed by the one or more processors, cause the one or more processors to perform operations, comprising:
initiating a website optimization experiment to determine whether a particular landing page configuration from among the plurality of alternative landing page configurations including a current landing page configuration performs better than any other alternative landing page configurations;
collecting statistics related to a performance of each of the plurality of alternative landing pages configurations;
producing adjusted statistics by adjusting the statistics based upon at least one of a first correction for performing multiple comparisons if there are more than two alternative landing page configurations, and a second correction for performing an interim analysis if the determination is being made prior to the scheduled end of the website optimization experiment;
receiving a communication from a client device responsive to the client device loading an instrumented landing page comprising the plurality of alternative landing page configurations, the communication comprising a request to identify a selected landing page configuration from the plurality of alternative landing page configurations;
determining a preferred group of landing page configurations based upon analyzing the adjusted statistics, the preferred group of landing page configurations comprising one or more landing page configurations that are performing statistically significantly better than a non-preferred group of landing page configurations; and
providing, in response to the communication, a selected landing page configuration to the instrumented landing page based upon a determination of the preferred group of landing page configurations, the selected landing page configuration being selected from the preferred group of landing page configurations more frequently than from the non-preferred group of landing page configurations.

14. The computer readable media of claim 13, further comprising deferring determining a preferred group of landing page configurations until a reasonable sample size has been collected.

15. A method comprising:
collecting statistics associated with each of a plurality of alternative landing page configurations;
producing adjusted statistics by adjusting the statistics based upon at least one of a first correction for performing multiple comparisons if there are more than two alternative landing page configurations, and a second correction for performing an interim analysis if the determination is being made prior to a scheduled end of the website optimization experiment;
analyzing the adjusted statistics to identify a preferred group of landing page configurations and a non-preferred group of landing page configurations from the plurality of alternative landing page configurations, the landing page configurations of the preferred group providing statistically significantly better results than the landing page configurations of the non-preferred group; and
preferentially providing a landing page configuration to an instrumented landing page based upon the statistics, the landing page configuration being selected more frequently from the preferred group of landing page configurations than from the non-preferred group of landing page configurations.

16. The method of claim 15, further comprising reducing a cost associated with executing the method, the cost comprising an opportunity cost associated with each time a low-performing alternative landing page configuration from among the plurality of alternative landing page configurations is served to a client device relative to a higher performing alternative landing page configuration from among the plurality of alternative landing page configurations.

17. A method comprising:
initiating a website experiment comprising a comparison of a plurality of alternative landing page configurations, the website experiment having an experiment duration provided by a publisher of a website and being operable to determine a performance associated with each of the plurality of alternative landing page configurations;
collecting statistics associated with each of the plurality of alternative landing page configurations;
producing adjusted statistics by adjusting the statistics based upon at least one of a first correction for performing multiple comparisons if there are more than two alternative landing page configurations, and a second correction for performing an interim analysis if the determination is being made prior to a scheduled end of the website optimization experiment;

analyzing the adjusted statistics to identify one or more of the plurality of landing page configurations that is performing statistically significantly better than any other one or more of the plurality of landing page configurations; and determining whether to end the website experiment based upon the adjusted statistics.

* * * * *

UNITED STATES PATENT AND TRADEMARK OFFICE
CERTIFICATE OF CORRECTION

PATENT NO. : 8,234,632 B1  
APPLICATION NO. : 11/876221  
DATED : July 31, 2012  
INVENTOR(S) : Angela B. Hugeback et al.

It is certified that error appears in the above-identified patent and that said Letters Patent is hereby corrected as shown below:

Title Page, Column 2 (Other Publications), line 4, delete "Analysismethod" and insert
-- Analysis method --

Signed and Sealed this
Second Day of October, 2012

David J. Kappos
*Director of the United States Patent and Trademark Office*

UNITED STATES PATENT AND TRADEMARK OFFICE
CERTIFICATE OF CORRECTION

| | |
|---|---|
| PATENT NO. | : 8,234,632 B1 |
| APPLICATION NO. | : 11/876221 |
| DATED | : July 31, 2012 |
| INVENTOR(S) | : Hugeback et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this
Eleventh Day of December, 2012

David J. Kappos
*Director of the United States Patent and Trademark Office*